(12) United States Patent
Cao et al.

(10) Patent No.: US 11,093,458 B2
(45) Date of Patent: *Aug. 17, 2021

(54) AUTOMATIC ATTRIBUTE STRUCTURAL VARIATION DETECTION FOR NOT ONLY STRUCTURED QUERY LANGUAGE DATABASE

(71) Applicant: INTERNATIONAL BUSINESS MACHINES CORPORATION, Armonk, NY (US)

(72) Inventors: Zhao Cao, Beijing (CN); Ju Wei Shi, Beijing (CN); Chen Wang, Beijing (CN); Lanjun Wang, Beijing (CN); Shuo Zhang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/454,981

(22) Filed: Jun. 27, 2019

(65) Prior Publication Data
US 2019/0317927 A1   Oct. 17, 2019

Related U.S. Application Data

(63) Continuation of application No. 14/823,765, filed on Aug. 11, 2015, now Pat. No. 10,387,386.

(51) Int. Cl.
*G06F 11/20* (2006.01)
*G06F 16/21* (2019.01)

(52) U.S. Cl.
CPC .................. *G06F 16/211* (2019.01)

(58) Field of Classification Search
CPC .................................................. G06F 16/211
See application file for complete search history.

(56) References Cited

U.S. PATENT DOCUMENTS 6,606,620 B1 * 8/2003 Sundaresan ............. G06F 16/30
7,680,833 B1   3/2010 Cole et al.
(Continued)

OTHER PUBLICATIONS

China Patent Application No. 201410181384.1 entitled "Method and Device for Generation a Schema of a NOSQL", filed Apr. 30, 2014, 36 pages. (Year: 2014).*

(Continued)

*Primary Examiner* — Kris E Mackes
*Assistant Examiner* — Tiffany Thuy Bui
(74) *Attorney, Agent, or Firm* — Tutunjian & Bitetto, P.C; Joseph Petrokaitis

(57) ABSTRACT

Methods and a system are provided. A method includes automatically detecting, by an attribute structural variation detector, attribute structural variations in record schemas of a database lacking schema enforcement. The automatically detecting step includes encoding, by an encoder, nodes in the record schemas based on respective updated node labels to obtain a plurality of codes. The encoding step comprises, for each of the plurality of codes: recording, by a label frequency counter, a frequency $f_1$ of the record schemas that include a given label; and recording, by a label frequency counter, a frequency $f_c$ of the record schemas that use a given one of the plurality of codes to update a label of a next level. An attribute variation is detected and retrieved responsive to the frequency $f_c \neq 0$, and the frequency $f_1 >$(two times the frequency $f_c$).

9 Claims, 11 Drawing Sheets

(56) References Cited

U.S. PATENT DOCUMENTS

| | | | |
|---|---|---|---|
| 8,832,112 B2 | 9/2014 | Bestgen et al. | |
| 9,135,647 B2* | 9/2015 | Witten | G06Q 30/04 |
| 9,378,263 B2* | 6/2016 | Khimich | G06F 16/215 |
| 9,436,710 B2* | 9/2016 | Shoolman | G06F 16/21 |
| 2007/0271309 A1* | 11/2007 | Witriol | H04L 67/1095 |
| 2008/0021912 A1* | 1/2008 | Seligman | G06F 16/36 |
| 2013/0086104 A1* | 4/2013 | Morrison | G06F 16/211 |
| | | | 707/769 |
| 2013/0179769 A1 | 7/2013 | Gurfinkel et al. | |
| 2014/0095549 A1* | 4/2014 | Shi | G06F 16/211 |
| | | | 707/803 |
| 2014/0172833 A1* | 6/2014 | Taylor | G06F 16/24534 |
| | | | 707/722 |
| 2014/0214897 A1* | 7/2014 | Zhu | G06F 16/2455 |
| 2015/0154259 A1* | 6/2015 | Keeton | G06F 16/2282 |
| | | | 707/769 |

OTHER PUBLICATIONS

List of IBM Patents or Patent Applications Treated as Related dated Jun. 27, 2019, 2 pages.

Klettke, et al., "Schema Extraction and Structural Outlier Detection for JSON-based NoSQL Data Stores", BTW, Hamburg, Germany, May 2015, 20 pages.

* cited by examiner

AUTOMATIC ATTRIBUTE STRUCTURAL VARIATION DETECTION FOR NOT ONLY STRUCTURED QUERY LANGUAGE DATABASE

BACKGROUND

Technical Field

The present invention relates generally to information processing and, in particular, to automatic attribute structural variation detection for a Not only Structured Query Language (NoSQL) database.

Description of the Related Art

Unlike semi-structured data, such as eXtensible Markup Language (XML) which is always associated with XML Schema Definition (XSD), document stores using JavaScript Object Notation (JSON) are without explicit metadata and lack of schema enforcement through the provided Application Programming Interfaces (APIs). Thus, there is a need for an effective mechanism to discover metadata from document stores in a post-processing fashion.

However, retrieving metadata from a document store is a challenging task. As there is no constraint to guarantee only one object type in one collection (equivalent to a table in relational databases), a collection may include records corresponding to more than one object type whereas a relational table persists a single object type with only one schema. Moreover, schemas (i.e., sets of attributes) of the same object type in a collection might also vary because of attribute sparseness in Not only Structured Query Language (NoSQL) databases as well as data model evolutions caused by highly interactive adoption and removal of features.

SUMMARY

According to an aspect of the present invention, a method is provided. The method includes automatically detecting, by an attribute structural variation detector, attribute structural variations in record schemas of a database lacking schema enforcement. The automatically detecting step includes encoding, by an encoder, nodes in the record schemas based on respective updated node labels to obtain a plurality of codes. The encoding step comprises, for each of the plurality of codes: recording, by a label frequency counter, a frequency $f_1$ of the record schemas that include a given label; and recording, by a label frequency counter, a frequency $f_c$ of the record schemas that use a given one of the plurality of codes to update a label of a next level. An attribute variation is detected and retrieved responsive to the frequency $f_c \neq 0$, and the frequency $f_1 >$ (two times the frequency $f_c$).

According to another aspect of the present, a method is provided. The method includes automatically detecting, by an attribute structural variation detector, attribute structural variations in record schemas of a database lacking schema enforcement. The automatically detecting step includes encoding, by an encoder, nodes in the record schemas based on respective updated node labels to obtain a plurality of codes. The automatically detecting step further includes recording, by a label frequency counter, a frequency $f_1$ of the record schemas that include a given label. The automatically detecting step also includes recording, by a code use frequency counter, a frequency $f_c$ of the record schemas that use a given one of the plurality of codes to update a label of a next level. An attribute variation is detected and retrieved responsive to the frequency $f_c \neq 0$, and the frequency $f_1 >$ (two times the frequency $f_c$).

According to yet another aspect of the present invention, a system is provided for automatically detecting attribute structural variations in record schemas of a database lacking schema enforcement. The system includes an encoder for encoding nodes in the record schemas based on respective updated node labels to obtain a plurality of codes. The encoder, for each of the plurality of codes: records a frequency $f_1$ of the record schemas that include a given label; and records a frequency $f_c$ of the record schemas that use a given one of the plurality of codes to update a label of a next level. An attribute variation is detected and retrieved responsive to the frequency $f_c \neq 0$, and the frequency $f_1 >$ (two times the frequency $f_c$).

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to automatic attribute structural variation detection for a Not only Structured Query Language (NoSQL) database.

Figure 1:
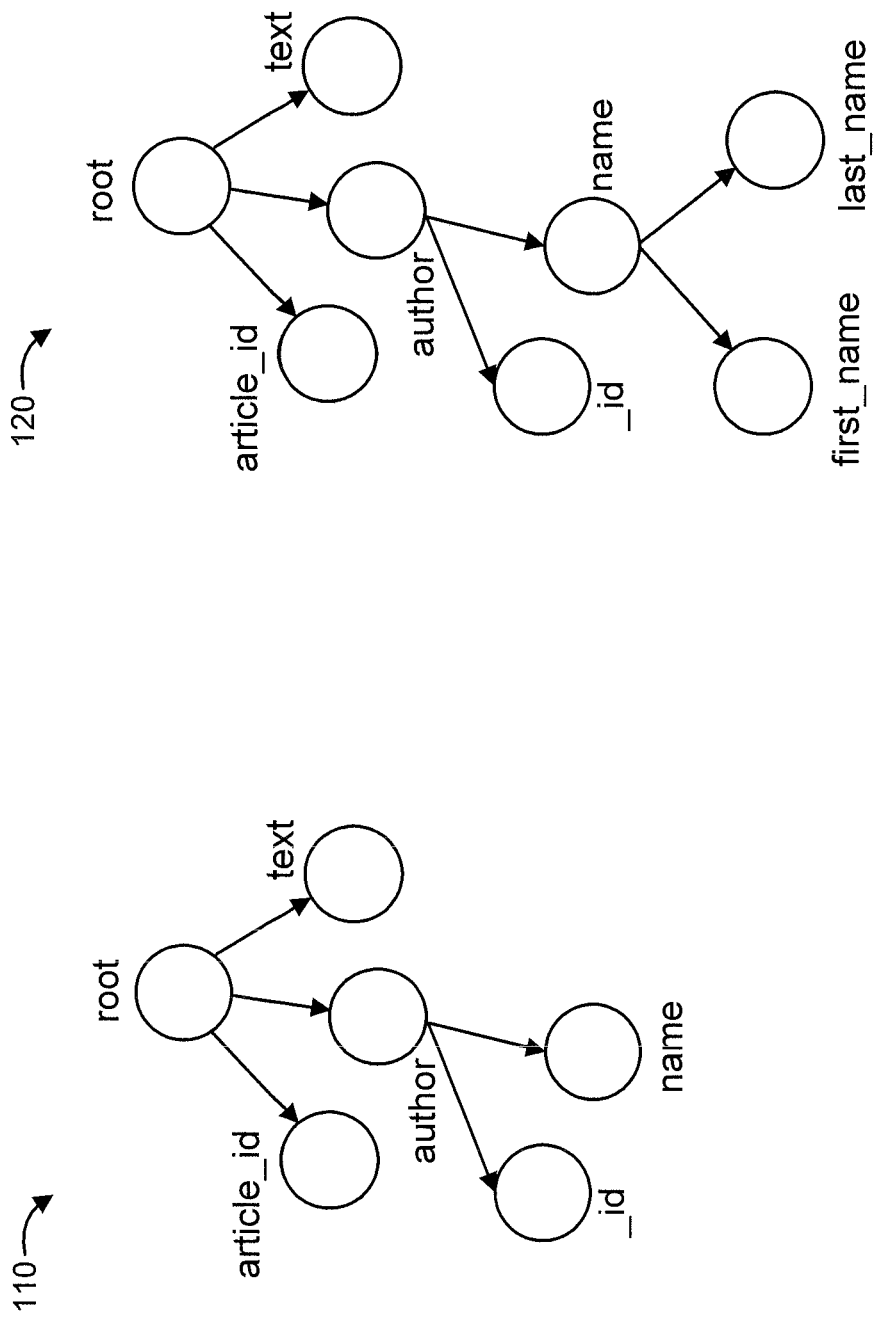
FIG. 1 shows two exemplary record schemas 110 and 120 having structural variations there between, in accordance with an embodiment of the present principles.

In automatic attribute structural variation detection for a NoSQL database, record schemas are input, and meaningful structural variation pairs are output. FIG. 1 shows two exemplary record schemas 110 and 120 having structural variations there between, in accordance with an embodiment of the present principles. For automatic attribute structural variation detection, the input would be records schemas 110 and 120. It is noted that record schema 120 includes structural variations with respect to record schema 110. In particular, record schema 120 includes, in addition to the nodes also included in record schema 110, a node labelled "first_name" and another node labelled "last_name". An output of the automatic attribute structural variation detection can be, for example, {root→author→name}={root→author→name→first_name, root→author→name→last_name}. Some exemplary benefits of automatic attribute structural variation detection in accordance with the present principles include a concise format for generating a unique data model (remove duplications), support for implicit queries to fetch values, and data model provenance.

Figure 2:
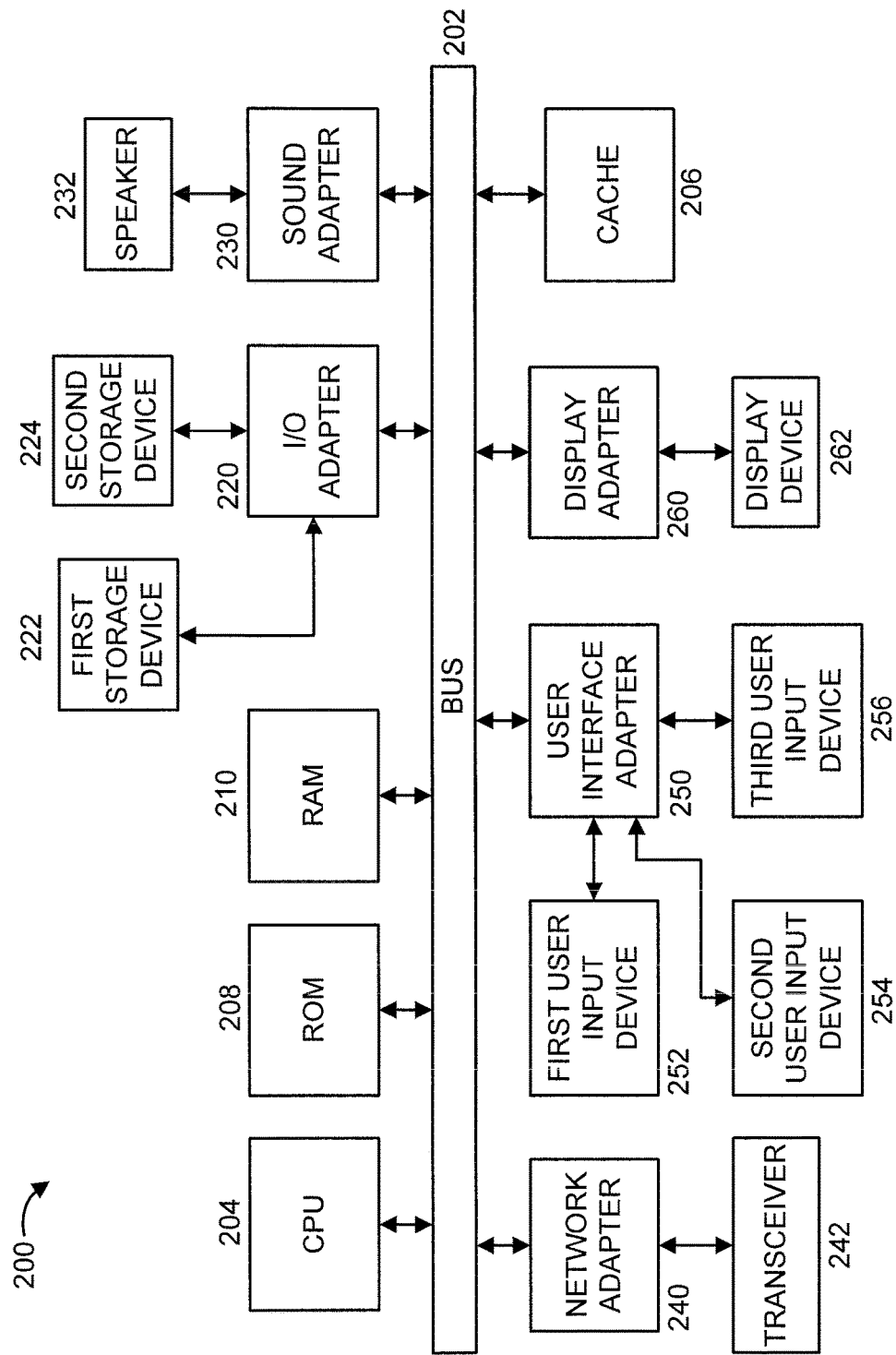
FIG. 2 shows an exemplary processing system 200 to which the present principles may be applied, in accordance with an embodiment of the present principles.

FIG. 2 shows an exemplary processing system 200 to which the present principles may be applied, in accordance with an embodiment of the present principles. The processing system 200 includes at least one processor (CPU) 204 operatively coupled to other components via a system bus 202. A cache 206, a Read Only Memory (ROM) 208, a Random Access Memory (RAM) 210, an input/output (I/O) adapter 220, a sound adapter 230, a network adapter 240, a user interface adapter 250, and a display adapter 260, are operatively coupled to the system bus 202.

A first storage device 222 and a second storage device 224 are operatively coupled to system bus 202 by the I/O adapter 220. The storage devices 222 and 224 can be any of a disk storage device (e.g., a magnetic or optical disk storage device), a solid state magnetic device, and so forth. The storage devices 222 and 224 can be the same type of storage device or different types of storage devices.

A speaker 232 is operatively coupled to system bus 202 by the sound adapter 230. A transceiver 242 is operatively coupled to system bus 202 by network adapter 240. A display device 262 is operatively coupled to system bus 202 by display adapter 260.

A first user input device 252, a second user input device 254, and a third user input device 256 are operatively coupled to system bus 202 by user interface adapter 150. The user input devices 252, 254, and 256 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 252, 254, and 256 can be the same type of user input device or different types of user input devices. The user input devices 252, 254, and 256 are used to input and output information to and from system 200.

Of course, the processing system 200 may also include other elements (not shown), as readily contemplated by one of skill in the art, as well as omit certain elements. For example, various other input devices and/or output devices can be included in processing system 200, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 200 are readily contemplated by one of ordinary skill in the art given the teachings of the present principles provided herein.

Figure 3:
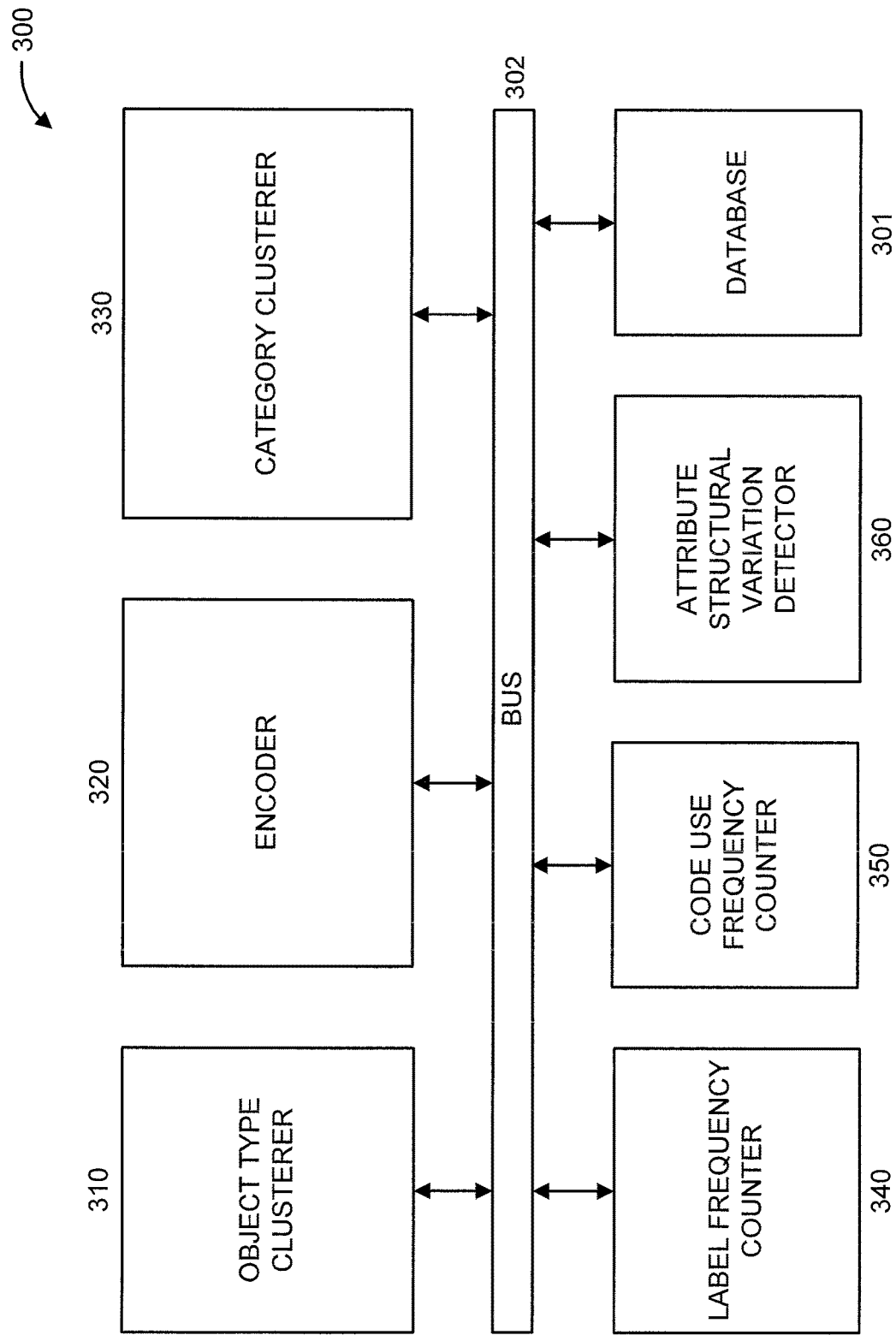
FIG. 3 shows an exemplary system 300 for automatic attribute structural variation detection for a NoSQL database, in accordance with an embodiment of the present principles.

Moreover, it is to be appreciated that system 300 described below with respect to FIG. 3 is a system for implementing respective embodiments of the present principles. Part or all of processing system 200 may be implemented in one or more of the elements of system 300.

Figure 4:
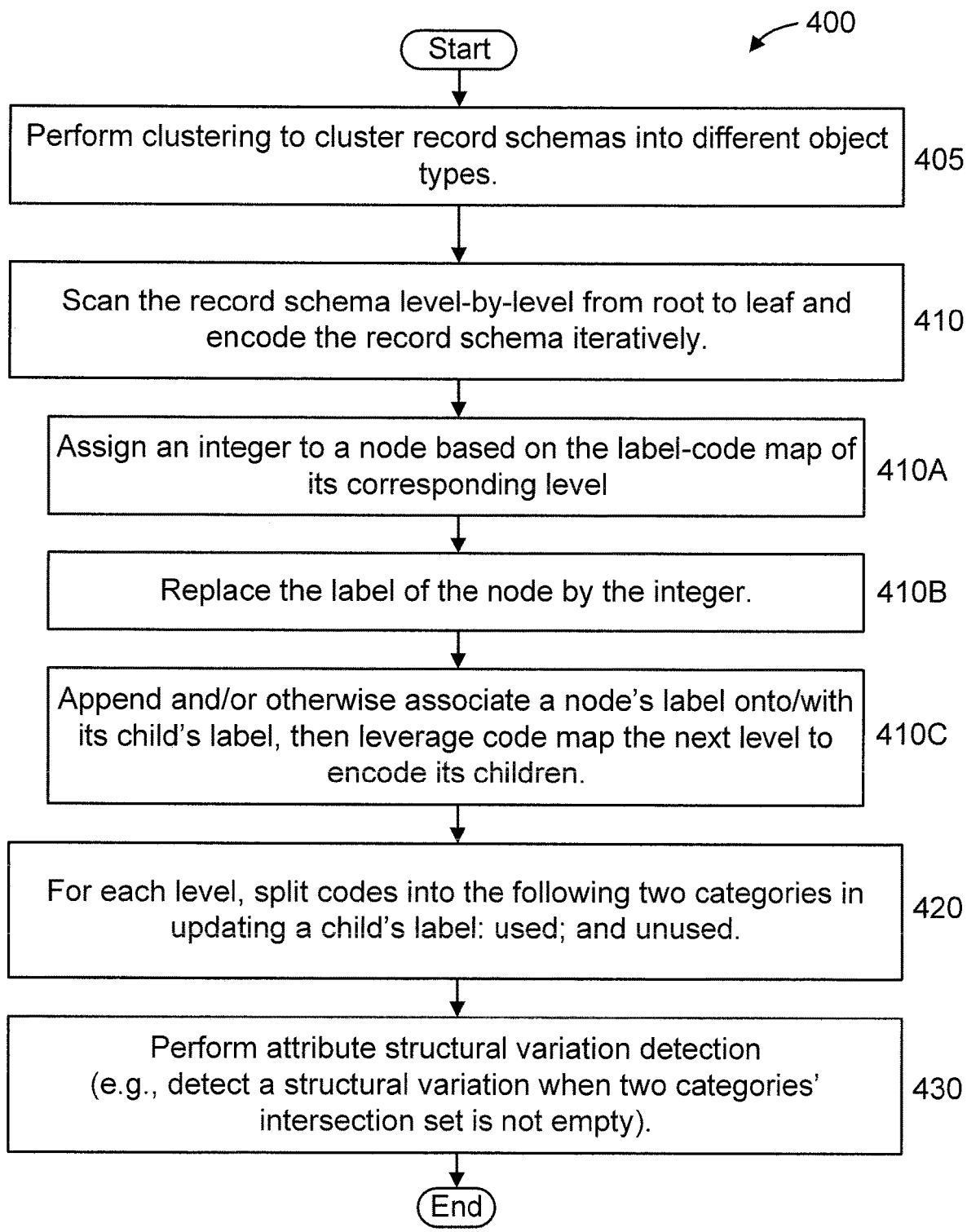
FIG. 4 shows an exemplary method 400 for automatic attribute structural variation detection for a NoSQL database, in accordance with an embodiment of the present principles.

Further, it is to be appreciated that processing system 200 may perform at least part of the method described herein including, for example, at least part of method 400 of FIG. 4. Similarly, part or all of system 300 may be used to perform at least part of method 400 of FIG. 4.

FIG. 3 shows an exemplary system 300 for automatic attribute structural variation detection for a NoSQL database, in accordance with an embodiment of the present principles.

The system 300 includes an object type clusterer 310, an encoder 320, a category clusterer 330, a label frequency counter 340, a code use frequency counter 350, and an attribute structural variation detector 360.

The system 300 includes or interfaces with a database 301. In the embodiment of FIG. 3, the database 301 is included in system 300. In other embodiments, the system 300 interfaces with the database, which can be local or remote with respect to the system 300. For example, in an embodiment, the system 300 can be implemented using a cloud configuration. In an embodiment, database 301 is a Not only Structured Query Language (NoSQL) database. However, it is to be appreciated that the present principles can advantageously be applied to any type of database that lacks schema enforcement. These and other variations of system 300 are readily determined by one of ordinary skill in the art given the teachings of the present principles provided herein, while maintaining the spirit of the present principles The object type clusterer 310 performs clustering to differentiate between different object types. In an embodiment, the methods described herein (methods 400 and 600) are performed for the schema records of a same one of the different object types.

The encoder 320 encodes nodes in the record schemas based on respective updated node labels to obtain a plurality of codes.

The category clusterer 330 clusters the plurality of codes into one of a used category and an unused category, the used category and the unused category respectively consisting of any of the plurality of codes used or unused to update a child label.

The label frequency counter 340 determines a frequency, $f_l$, of record schemas that include a given label, as described in further detail herein below.

The code use frequency counter 350 determines a frequency, $f_c$, of record schemas that use a given code to update the label of the next level, as described in further detail herein below.

The attribute structural variation detector 360 detects and retrieves (outputs) attribute structural variations. In an embodiment, when an intersection set formed from the used and unused categories has at least one member, the at least one member is retrieved as a structural variation between at least two of the record schemas. In an embodiment, an attribute variation is detected and retrieved responsive to respective values of the frequency $f_l$ and the frequency $f_c$.

For example, the attribute variation is detected and retrieved responsive to the frequency $f_c \neq 0$, and the frequency $f_1 >$ (two times the frequency $f_c$).

In the embodiment shown in FIG. 3, the elements thereof are interconnected by a bus 302. However, in other embodiments, other types of connections can also be used. Moreover, in an embodiment, at least one of the elements of system 300 is processor-based. Further, while one or more elements may be shown as separate elements, in other embodiments, these elements can be combined as one element. The converse is also applicable, where while one or more elements may be part of another element, in other embodiments, the one or more elements may be implemented as standalone elements. These and other variations of the elements of system 300 are readily determined by one of ordinary skill in the art, given the teachings of the present principles provided herein, while maintaining the spirit of the present principles.

FIG. 4 shows an exemplary method 400 for automatic attribute structural variation detection for a NoSQL database, in accordance with an embodiment of the present principles.

At step 405, perform clustering to cluster record schemas into different object types. In an embodiment, steps 410 through 430 are performed for the record schemas of one of the different object types, and can be repeated for another one of the different object types, and so on.

At step 410, scan the record schema level-by-level from root to leaf and encode the record schema iteratively. Step 410 includes steps 410A, 410B, and 410C.

At step 410A, assign an integer to a node based on the label-code map of its corresponding level. In an embodiment, the label-code map for a given level is a listing of the labels on that level. In an embodiment, step 410A can be represented by a data arrangement (data structure) for each node that includes the level the node is on, the label assigned to that node, and the integer assigned to that node. Any of the preceding data elements can be explicitly or implicitly provided. For example, an arrangement omitting the level can be predetermined to be first level after the root level/node. Examples of the preceding data arrangement are provided below. However, the present principles are not limited to the specific examples and thus other data arrangements can also be used while maintaining the spirit of the present principles.

At step 410B, replace the label of the node by the integer.

At step 410C, append and/or otherwise associate a node's label (i.e., the integer itself, which serves as an updated label) onto/with its child's label, then leverage code map the next level to encode its children.

Figure 5:
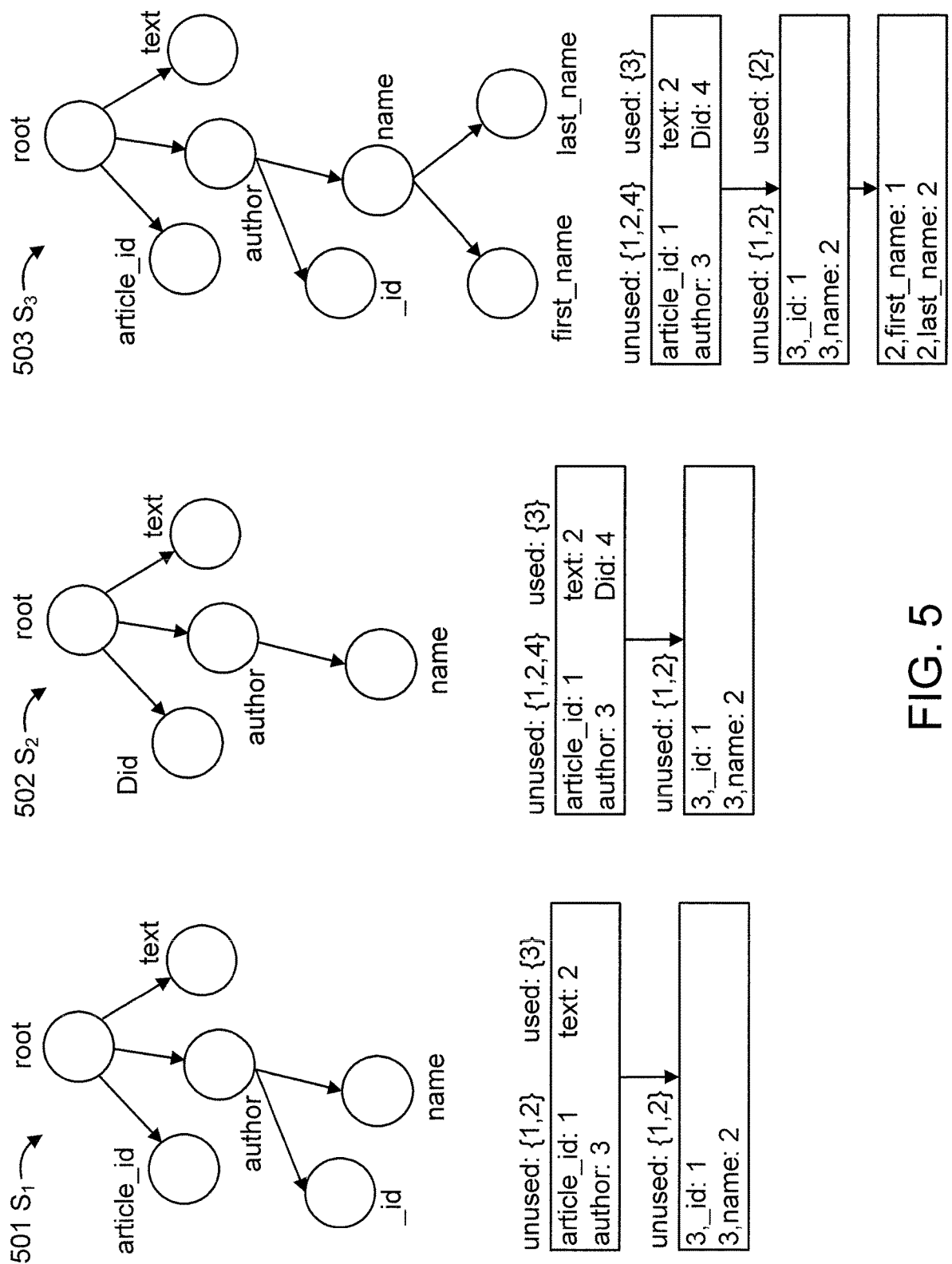
FIG. 5 shows method 400 of FIG. 4 applied to three record schemas 501 $S_1$, 502 $S_2$, and 503 $S_3$, in accordance with an embodiment of the present principles.

As an example of the former portion of step 410C ("append and/or otherwise associate a node's label onto/with its child's label"), we point to the box in the lower left corner of FIG. 5, where the child's label which was previously "_id" is updated to "3,_id".

As used herein, leverage code map the next level to encode its children refers to using the code map to update the nodes whose parent nodes are in the code map. As an example of the latter portion of step 410C ("leverage code map the next level to encode its children"), we point to the box in the lower right corner of FIG. 5, where to encode the nodes in level 3 the code map of level 2 used (such that, e.g., "first_name" is updated to "2,first_name").

At step 420, for each level, split codes into the following two categories in updating a child's label: used; and unused.

At step 430, perform attribute structural variation detection. Step 430 involves, for each level, detecting a structural variation when two categories' intersection set is not empty.

FIG. 5 shows method 400 of FIG. 4 applied to three record schemas 501 $S_1$, 502 $S_2$, and 503 $S_3$, in accordance with an embodiment of the present principles. To that end, FIG. 5 shows the three schemas 501 $S_1$, 502 $S_2$, and 503 $S_3$. It is to be note that method 400 does not address naming convention issues (e.g., different names for similarly positioned nodes) or missing nodes (e.g., "id" is missing from schema 501 $S_2$, relative to schemas 501 $S_1$ and 503 $S_3$), such that only additional nodes (e.g., "first_name" and "last_name") are detected).

In schema 501 $S_1$, the following applies:

For the first level after the root level/node (article_id, author, text), the integer assignments (step 410A) and code categories (step 420) are as follows:
article_id: 1
text: 2
author: 3
unused:{1, 2} and used: {3}

For the second level after the root level/node (_id, name), the integer assignments (step 410A) and code categories (step 420) are as follows:
3,_id: 1
3,name: 2
unused: {1, 2}

In schema 502 $S_2$, the following applies:

For the first level after the root level/node (did, author, text), the integer assignments (step 410A) and code categories (step 420) are as follows:
article_id: 1
text: 2
author: 3
Did: 4
unused: {1, 2, 4} and used: {3}

For the second level after the root level/node (name), the integer assignments (step 410A) and code categories (step 420) are as follows:
3,_id: 1
3,name: 2
unused: {1, 2}

In schema 503 $S_3$, the following applies:

For the first level after the root level/node (article_id, author, text), the integer assignments (step 410A) and code categories (step 420) are as follows:
article_id: 1
text: 2
author: 3
did: 4
unused: {1, 2, 4} and used: {3}

For the second level after the root level/node (_id, name), the integer assignments (step 410A) and code categories (step 420) are as follows:
3,_id: 1
3,name: 2
unused: {1, 2} and used: {2}

For the third (last) level after the root level/node (first_name, last_name), where automatic attribute structural variation detection (step 430) results in the following:
2,first_name: 1
2,last_name: 2

Figure 6:
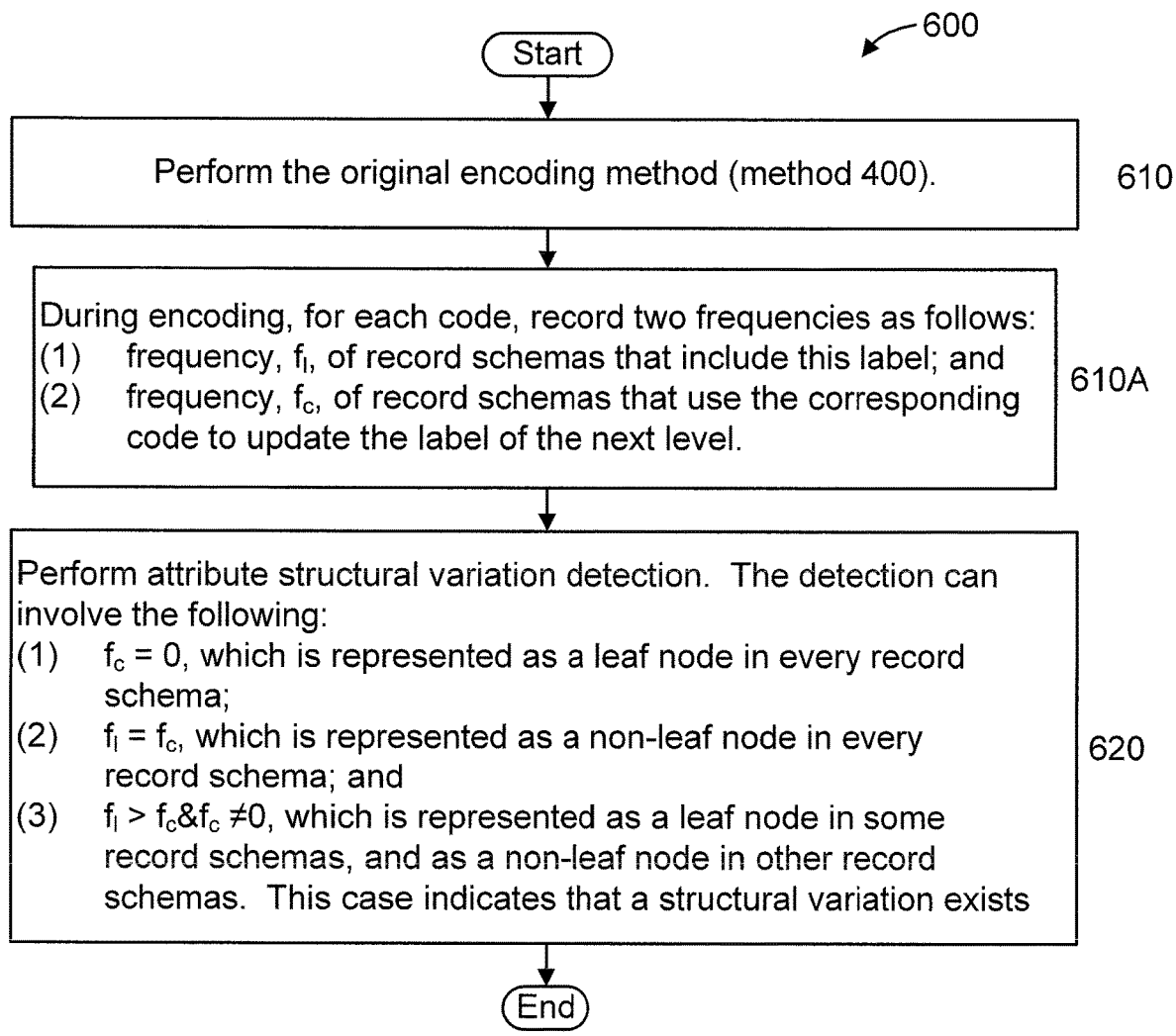
FIG. 6 shows another exemplary method 600 for automatic attribute structural variation detection for a NoSQL database, in accordance with an embodiment of the present principles.

FIG. 6 shows another exemplary method 600 for automatic attribute structural variation detection for a NoSQL database, in accordance with an embodiment of the present principles. The method 600 is based on statistics.

At step 610, perform the original encoding method (method 400).

At step 610A (step 410), during encoding, for each code, record two frequencies as follows: (1) the frequency, $f_1$, of record schemas that include this label; and (2) the frequency, $f_c$, of record schemas that use the corresponding code to update the label of the next level.

At step 620, perform attribute structural variation detection. The detection can involve the following:

$f_c=0$, which is represented as a leaf node in every record schema;

$f_1=f_c$, which is represented as a non-leaf node in every record schema;

$f_1 > f_c \& f_c \neq 0$, which is represented as a leaf node in some record schemas, and as a non-leaf node in other record schemas. This case indicates that a structural variation exists. We note that fc&fc is equivalent to fc+fc as well as two times (2×) fc.

In an embodiment of method 600, step 420 can be skipped and step 430 is modified to consider the preceding rules to detect an attribute structural variation. However, in other embodiments, method 400 with step 420 can be performed, so that the inventive concepts of both methods are implicated to detect an attribute structural variation.

Figure 7:
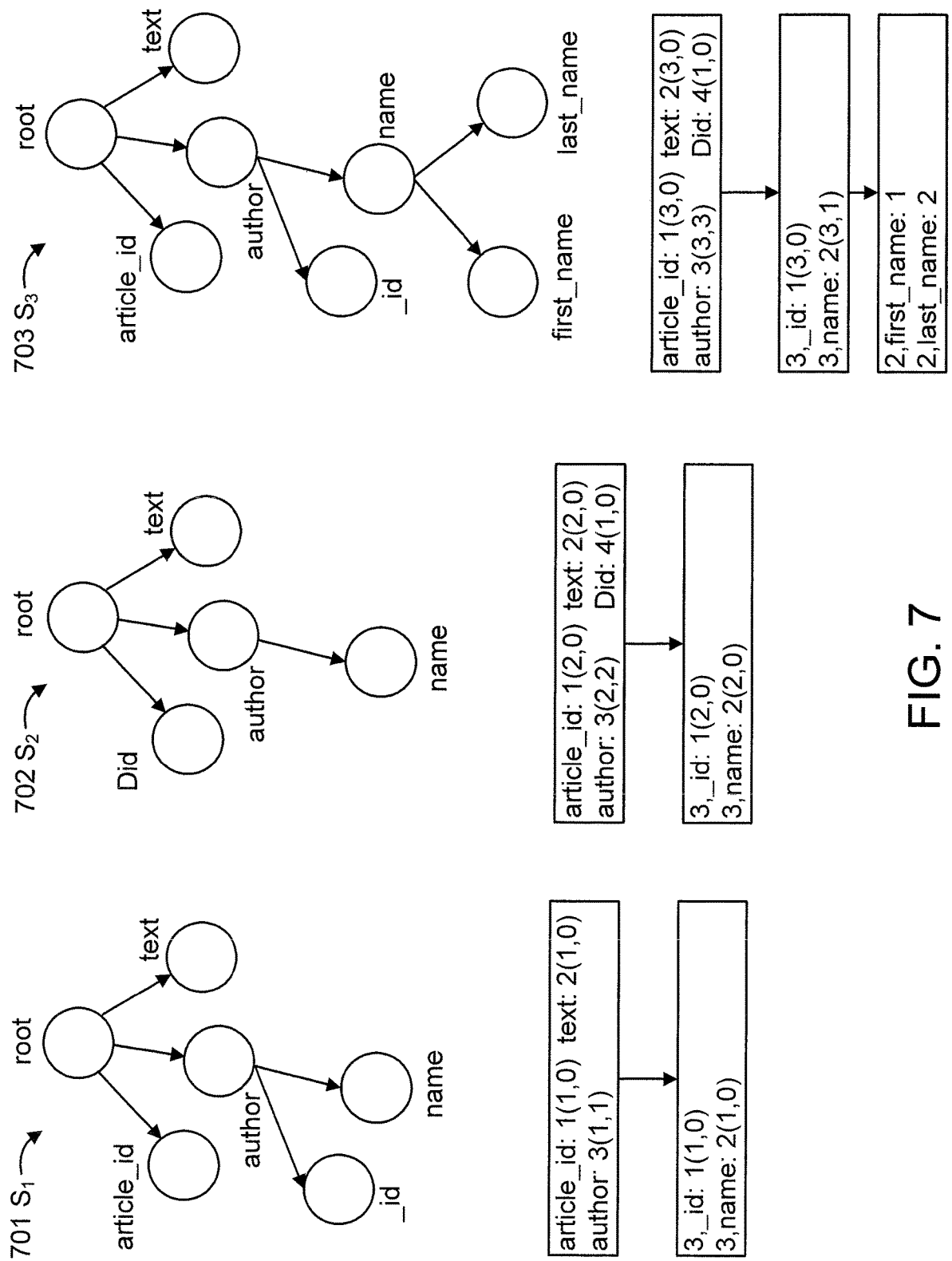
FIG. 7 shows method 600 of FIG. 6 applied to three record schemas 701 $S_1$, 702 $S_2$, and 703 $S_3$, in accordance with an embodiment of the present principles.

FIG. 7 shows method 600 of FIG. 6 applied to three record schemas 701 $S_1$, 702 $S_2$, and 703 $S_3$, in accordance with an embodiment of the present principles. To that end, FIG. 7 shows the three schemas 701 $S_1$, 702 $S_2$, and 703 $S_3$. We note that schemas 501 $S_1$, 502 $S_2$, and 703 $S_3$ (from FIG. 5) are equivalent to schemas 701 $S_1$, 702 $S_2$, and 703 $S_3$ (from FIG. 7), but the corresponding methods applied thereto are different as shown in these Figures.

In schema 701 $S_1$, the following applies:

For the first level after the root level/node (article_id, author, text), the recorded frequencies $f_1$ and $f_c$ are as follows:
article_id: 1 (1,0)
text: 2 (1,0)
author: 3 (1,1)

For the second level after the root level/node (_id, name), the recorded frequencies $f_1$ and $f_c$ are as follows:
3,_id: 1 (1,0)
3,name: 2 (1,0)

In schema 702 $S_2$, the following applies:

For the first level after the root level/node (did, author, text), the recorded frequencies $f_1$ and $f_c$ are as follows:
article_id: 1 (2,0)
text: 2 (2,0)
author: 3 (2,2)
Did: 4 (1,0)

For the second level after the root level/node (name), the recorded frequencies $f_1$ and $f_c$ are as follows:
3,_id: 1 (2,0)
3,name: 2 (2,0)

In schema 703 $S_3$, the following applies:

For the first level after the root level/node (article_id, author, text), the recorded frequencies $f_1$ and $f_c$ are as follows:
article_id: 1 (3,0)
text: 2 (3,0)
author: 3 (3,3)
did: 4 (1,0)

For the second level after the root level/node (_id, name), the recorded frequencies $f_1$ and $f_c$ are as follows:
3,_id: 1 (3,0)
3,name: 2 (3,1)

For the third (last) level after the root level/node (first_name, last_name), where automatic attribute structural variation detection (step 620) results in the following:
2,first_name: 1
2,last_name: 2

Figure 8:
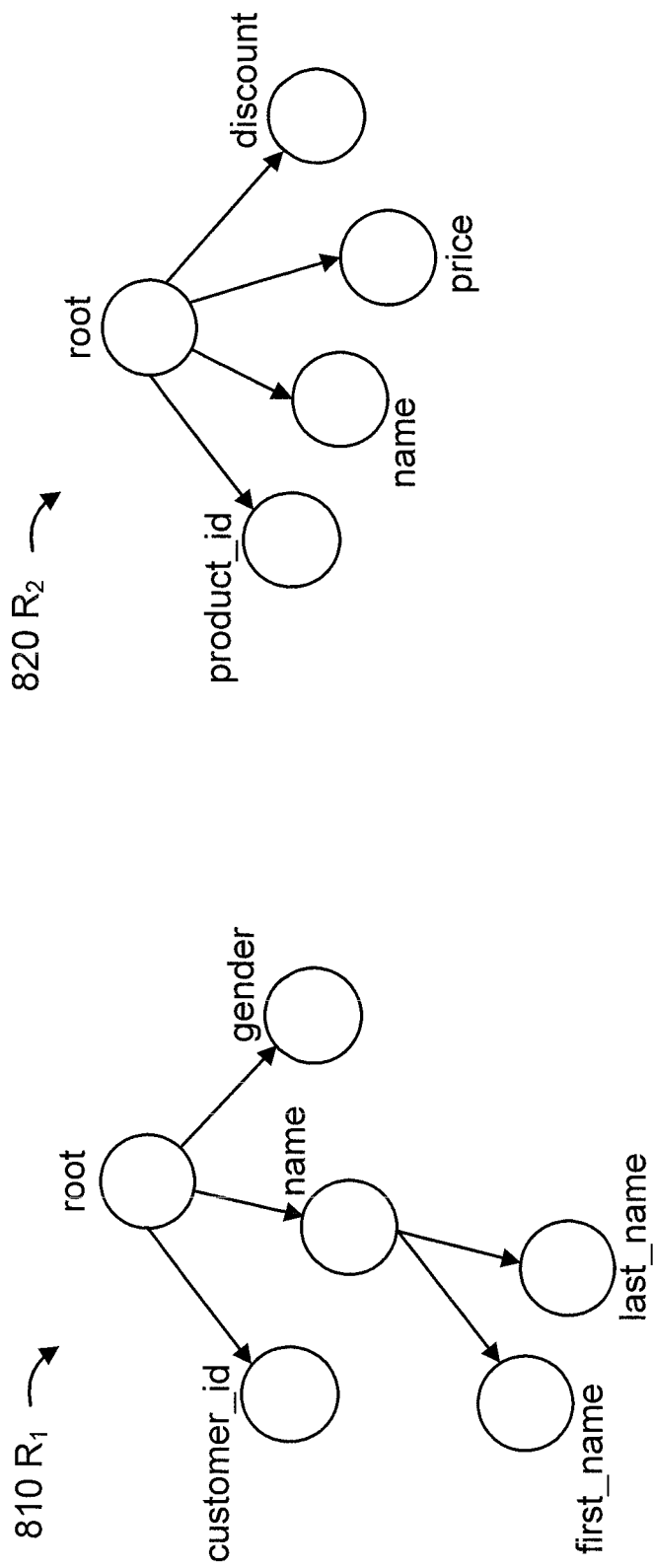
FIG. 8 shows two exemplary record schemas 810 $R_1$ and 820 $R_2$ to which the present principles can be applied, in accordance with an embodiment of the present principles.

A description will now be given regarding the problem of significance, with respect to FIG. 8. FIG. 8 shows two exemplary record schemas 810 $R_1$ and 820 $R_2$ to which the present principles can be applied, in accordance with an embodiment of the present principles.

R1: {"customer_id": 534, "name":{"first_name": "James", "last_name":"Bond"}, "gender":"Male"}

R2: {"product_id": "KM4ew", "name": "Shampoo", "price":10.8, "discount":true}

The attribute structural detector might output some meaningless results, based on the structural variation results. For example, based on the previous method (method 600), there is a structural variance in the following two records as: {root→name}={root→name→first_name, root→name→last_name}. However, these two attributes are from two different object types (product and customer).

The solution to this problem is to cluster records into different object types before attribute structural variance detection.

A clustering method will now be described, in accordance with an embodiment of the present principles. The clustering method can relate to step 405 of method 400.

The method is applied to features, which can include the following: an attribute name; an instance; and a composite attribute and instance as the feature.

The attribute name can be for example, a schema of a record such as, for example:
feature of R1: root→customer_id, root→name→first_name, root→name→last_name, root→gender
feature of R2: root→product_id, root→name, root→price, root→discount The instance can be a value of a record such as, for example:
feature of R1::{"Male"}
feature of R2: {"Shampoo"}

The method applied to the features can be, for example, but is not limited to, K-Means, the faster-neighbor clustering algorithm, and so forth.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 9:
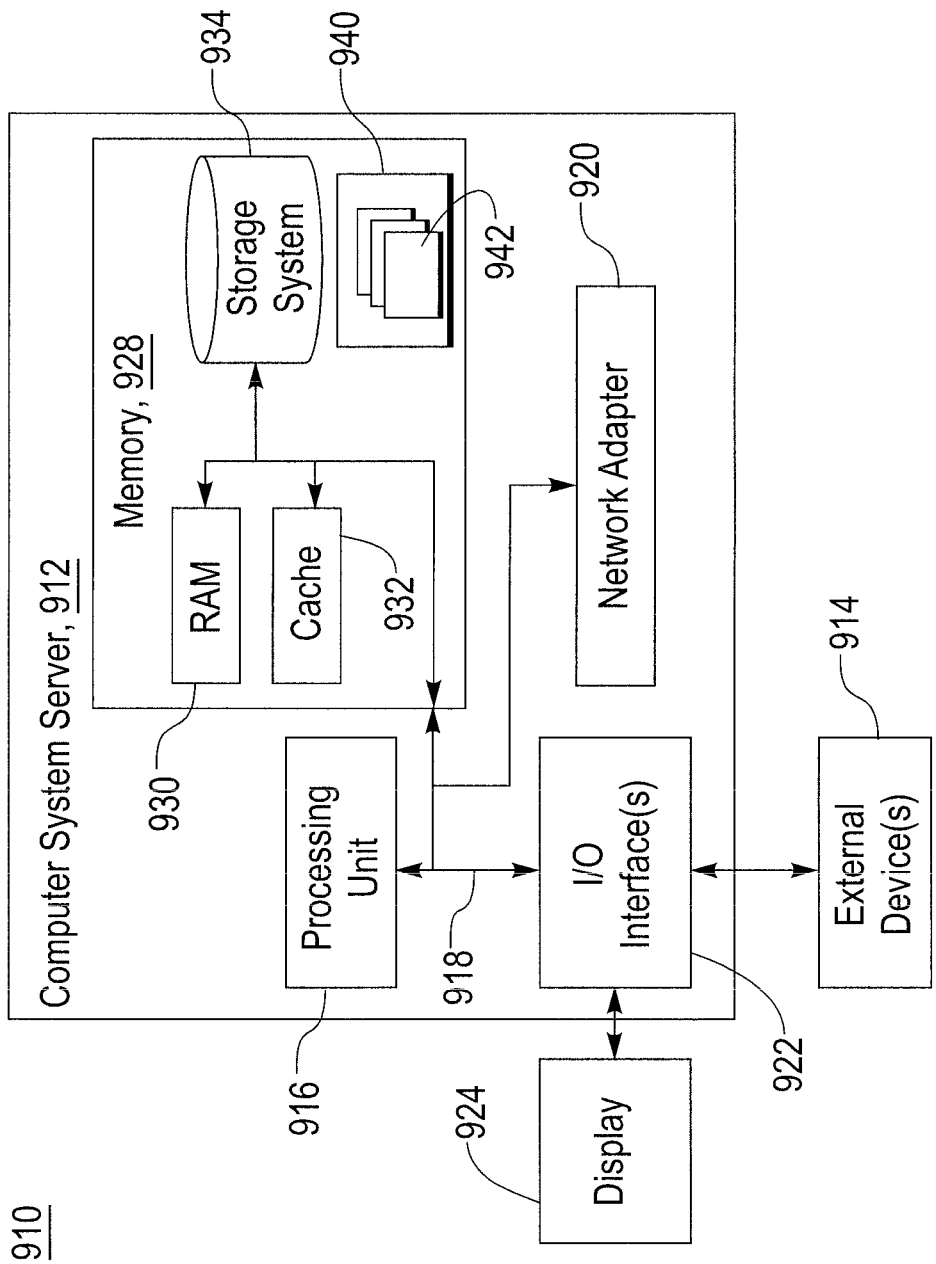
FIG. 9 shows an exemplary cloud computing node 910, in accordance with an embodiment of the present principles.

Referring now to FIG. 9, a schematic of an example of a cloud computing node 910 is shown. Cloud computing node 910 is only one example of a suitable cloud computing node and is not intended to suggest any limitation as to the scope of use or functionality of embodiments of the invention described herein. Regardless, cloud computing node 910 is capable of being implemented and/or performing any of the functionality set forth hereinabove.

In cloud computing node 910 there is a computer system/server 912, which is operational with numerous other general purpose or special purpose computing system environments or configurations. Examples of well-known computing systems, environments, and/or configurations that may be suitable for use with computer system/server 912 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 912 may be described in the general context of computer system executable instructions, such as program modules, being executed by a computer system. Generally, program modules may include routines, programs, objects, components, logic, data structures, and so on that perform particular tasks or implement particular abstract data types. Computer system/server 912 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 912 in cloud computing node 910 is shown in the form of a general-purpose computing device. The components of computer system/server 912 may include, but are not limited to, one or more processors or processing units 916, a system memory 928, and a bus 918 that couples various system components including system memory 928 to processor 916.

Bus 918 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 912 typically includes a variety of computer system readable media. Such media may be any available media that is accessible by computer system/server 912, and it includes both volatile and non-volatile media, removable and non-removable media.

System memory 928 can include computer system readable media in the form of volatile memory, such as random access memory (RAM) 930 and/or cache memory 932. Computer system/server 912 may further include other removable/non-removable, volatile/non-volatile computer system storage media. By way of example only, storage system 934 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 918 by one or more data media interfaces. As will be further depicted and described below, memory 928 may include at least one program product having a set (e.g., at least one) of program modules that are configured to carry out the functions of embodiments of the invention.

Program/utility 940, having a set (at least one) of program modules 942, may be stored in memory 928 by way of example, and not limitation, as well as an operating system, one or more application programs, other program modules, and program data. Each of the operating system, one or more application programs, other program modules, and program data or some combination thereof, may include an implementation of a networking environment. Program modules 942 generally carry out the functions and/or methodologies of embodiments of the invention as described herein.

Computer system/server 912 may also communicate with one or more external devices 914 such as a keyboard, a pointing device, a display 924, etc.; one or more devices that enable a user to interact with computer system/server 912; and/or any devices (e.g., network card, modem, etc.) that enable computer system/server 912 to communicate with one or more other computing devices. Such communication can occur via Input/Output (I/O) interfaces 922. Still yet, computer system/server 912 can communicate with one or more networks such as a local area network (LAN), a general wide area network (WAN), and/or a public network (e.g., the Internet) via network adapter 920. As depicted, network adapter 920 communicates with the other components of computer system/server 912 via bus 918. It should be understood that although not shown, other hardware and/or software components could be used in conjunction with computer system/server 912. Examples, include, but are not limited to: microcode, device drivers, redundant processing units, external disk drive arrays, RAID systems, tape drives, data archival storage systems, etc.

Figure 10:
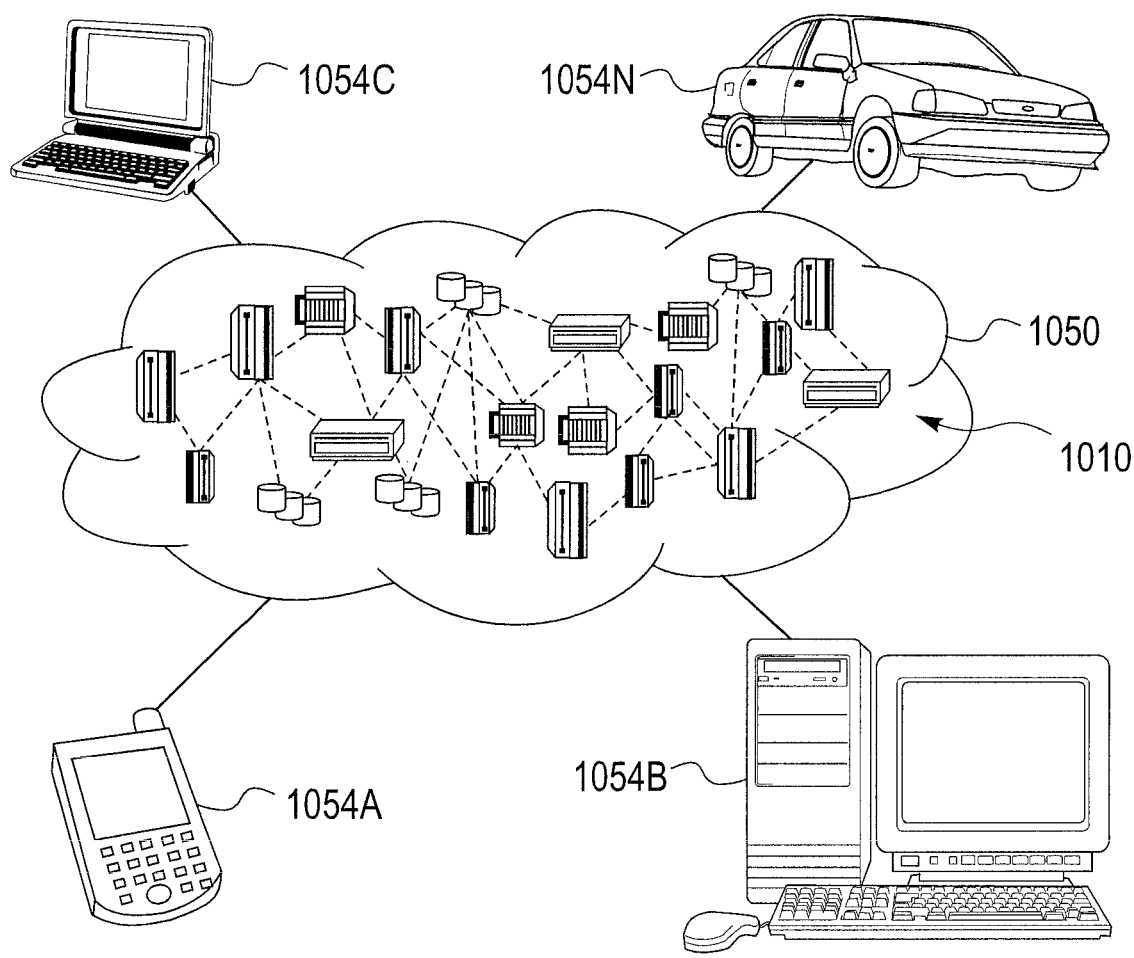
FIG. 10 shows an exemplary cloud computing environment 1050, in accordance with an embodiment of the present principles.

Referring now to FIG. 10, illustrative cloud computing environment 1050 is depicted. As shown, cloud computing environment 1050 comprises one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 10 are intended to be illustrative only and that computing nodes 1010 and cloud computing environment 1050 can communicate with any type of computerized device over any type of network and/or network addressable connection (e.g., using a web browser).

Figure 11:
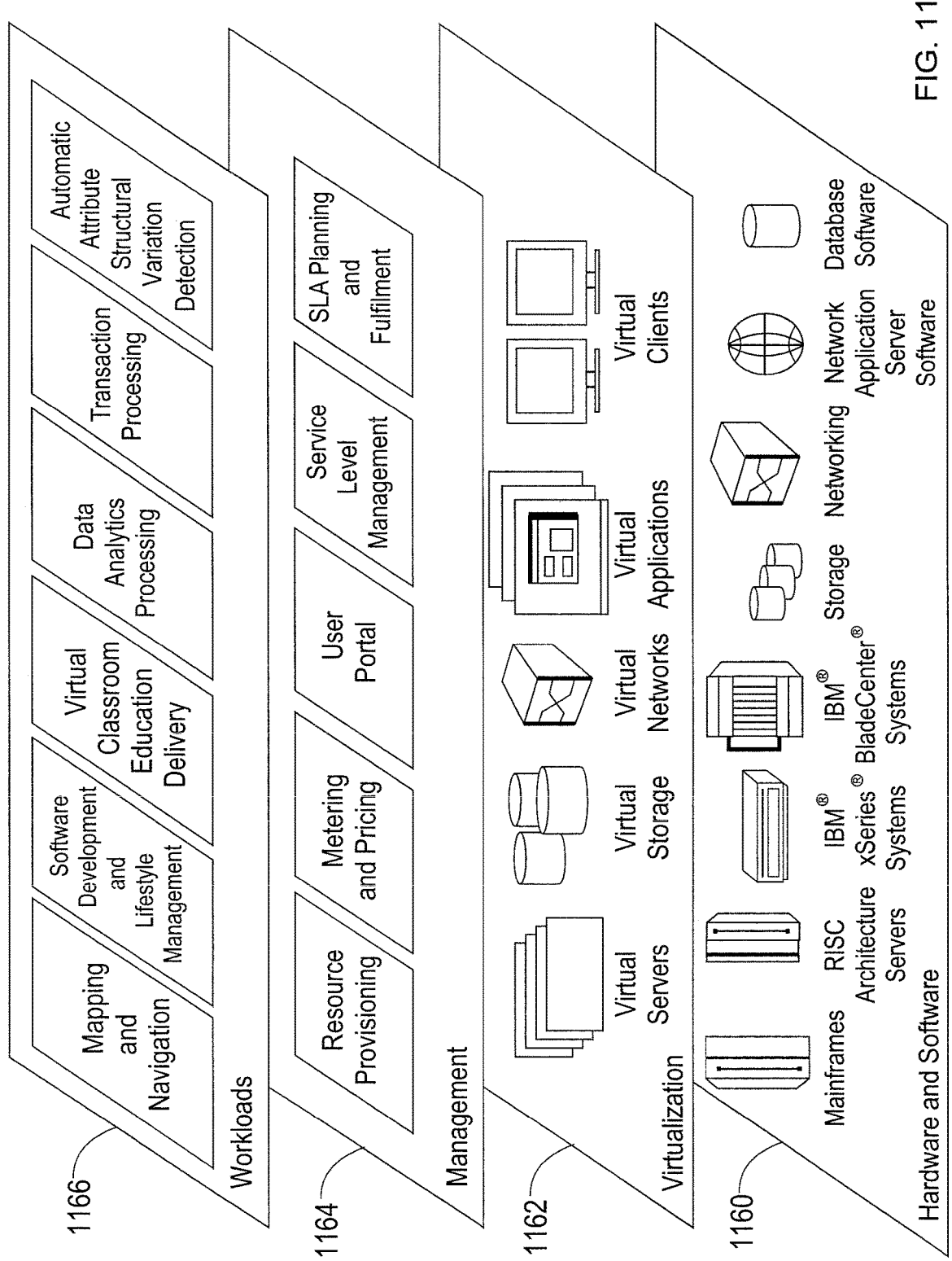
FIG. 11 shows exemplary abstraction model layers, in accordance with an embodiment of the present principles.

Referring now to FIG. 12, a set of functional abstraction layers provided by cloud computing environment 1150 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 1260 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1262 provides an abstraction layer from which the following examples of virtual entities may be provided: virtual servers; virtual storage; virtual networks, including virtual private networks; virtual applications and operating systems; and virtual clients.

In one example, management layer 1264 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide prearrangement for, and procurement of, cloud computing resources for which a future requirement is anticipated in accordance with an SLA.

Workloads layer 1266 provides examples of functionality for which the cloud computing environment may be utilized. Examples of workloads and functions which may be provided from this layer include: mapping and navigation; software development and lifecycle management; virtual classroom education delivery; data analytics processing; transaction processing; and automatic attribute structural variation detection.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method, comprising:
automatically detecting, by an attribute structural variation detector, attribute structural variations in record schemas of a database lacking schema enforcement, wherein said automatically detecting step includes:
encoding, by an encoder, nodes in the record schemas based on respective updated node labels to obtain a plurality of codes;
wherein said encoding step comprises, for each of the plurality of codes: recording, by a label frequency counter, a frequency fi of the record schemas that include a given label; and
recording, by a label frequency counter, a frequency fc of the record schemas that use a given one of the plurality of codes to update a label of a next level, wherein an attribute variation is detected and retrieved responsive to the frequency fc≠0, and the frequency fi>(two times the frequency fc),
wherein the attribute structural variations are automatically detected by the attribute structural variation detector based on following rules:
the frequency fc=0, which represents that a given node is a leaf node in all of the record schemas;
the frequency fi=the frequency fc, which represents that the given node is a non-leaf node in all of the record schemas; and
the frequency fi>a sum of the frequencies fc and fc≠0, which represents that the given node is the leaf node in some of the record schemas and the non-leaf node in others of the record schemas, thereby indicating that a structural variation exist.

2. The method of claim 1, wherein an attribute variation is detected and retrieved responsive to respective values of the frequency fi and the frequency fc.

3. The method of claim 1, wherein the database is a Not Only Structured Query Language database.

4. The method of claim 1, further comprising clustering, by a clusterer, to differentiate between different object types, and wherein the method is performed for the schema records of a same one of the different object types.

5. A non-transitory article of manufacture tangibly embodying a computer readable program which when executed causes a computer to perform the steps of claim 1.

6. A method, comprising:
automatically detecting, by an attribute structural variation detector, attribute structural variations in record schemas of a database lacking schema enforcement, wherein said automatically detecting step includes:
encoding, by an encoder, nodes in the record schemas based on respective updated node labels to obtain a plurality of codes;
recording, by a label frequency counter, a frequency fi of the record schemas that include a given label;
recording, by a code use frequency counter, a frequency fc of the record schemas that use a given one of the plurality of codes to update a label of a next level; and w herein an attribute variation is detected and retrieved responsive to the frequency fc≠0, and the frequency fi>(two times the frequency fc),
wherein the attribute structural variations are automatically detected by the attribute structural variation detector based on following rules:
the frequency fc=0, which represents that a given node is a leaf node in all of the record schemas;
the frequency fi=the frequency fc, which represents that the given node is a non-leaf node in all of the record schemas; and
the frequency fi>a sum of the frequencies fc and fc≠0, which represents that the given node is the leaf node in some of the record schemas and the non-leaf node in others of the record schemas, thereby indicating that a structural variation exist.

7. A non-transitory article of manufacture tangibly embodying a computer readable program which when executed causes a computer to perform the steps of claim 6.

8. A system for automatically detecting attribute structural variations in record schemas of a database lacking schema enforcement, the system comprising:
a non-transitory computer readable storage medium storing executable computer readable program instructions that, w when executed cause a computer processor to perform operations, comprising:
an encoder for encoding nodes in the record schemas based on respective updated node labels to obtain a plurality of codes;
wherein said encoder, for each of the plurality of codes:
records a frequency fi of the record schemas that include a given label; and
records a frequency fc of the record schemas that use a given one of the plurality of codes to update a label of a next level,
wherein an attribute variation is detected and retrieved responsive to the frequency fc≠0, and the frequency fi>(two times the frequency fc),
wherein the attribute structural variations are automatically detected by the attribute structural variation detector based on following rules:
the frequency fc=0, which represents that a given node is a leaf node in all of the record schemas;
the frequency fi=the frequency fc, which represents that the given node is a non-leaf node in all of the record schemas; and
the frequency fi>a sum of the frequencies fc and fc≠0, which represents that the given node is the leaf node in some of the record schemas and the non-leaf node in others of the record schemas, thereby indicating that a structural variation exist.

9. The system of claim 8, wherein an attribute variation is detected and retrieved responsive to respective values of the frequency fi and the frequency fc.

\* \* \* \* \*